Figure 1:
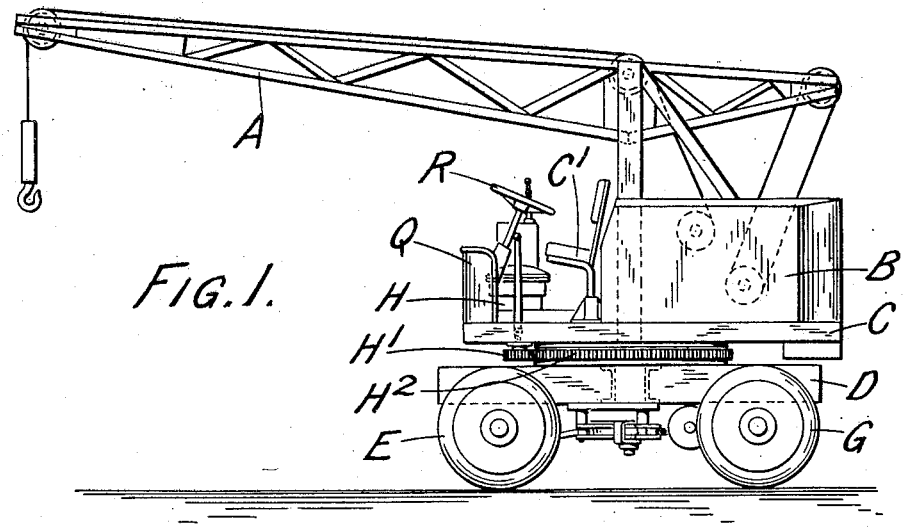

Feb. 16, 1932.  R. S. LEWIS  1,845,161
CRANE
Filed Feb. 25, 1929   2 Sheets-Sheet 1

Inventor,
Robert S. Lewis
Per
Watson, Coit, Morse & Grindle
Attys.

Feb. 16, 1932. R. S. LEWIS 1,845,161
CRANE
Filed Feb. 25, 1929 2 Sheets-Sheet 2
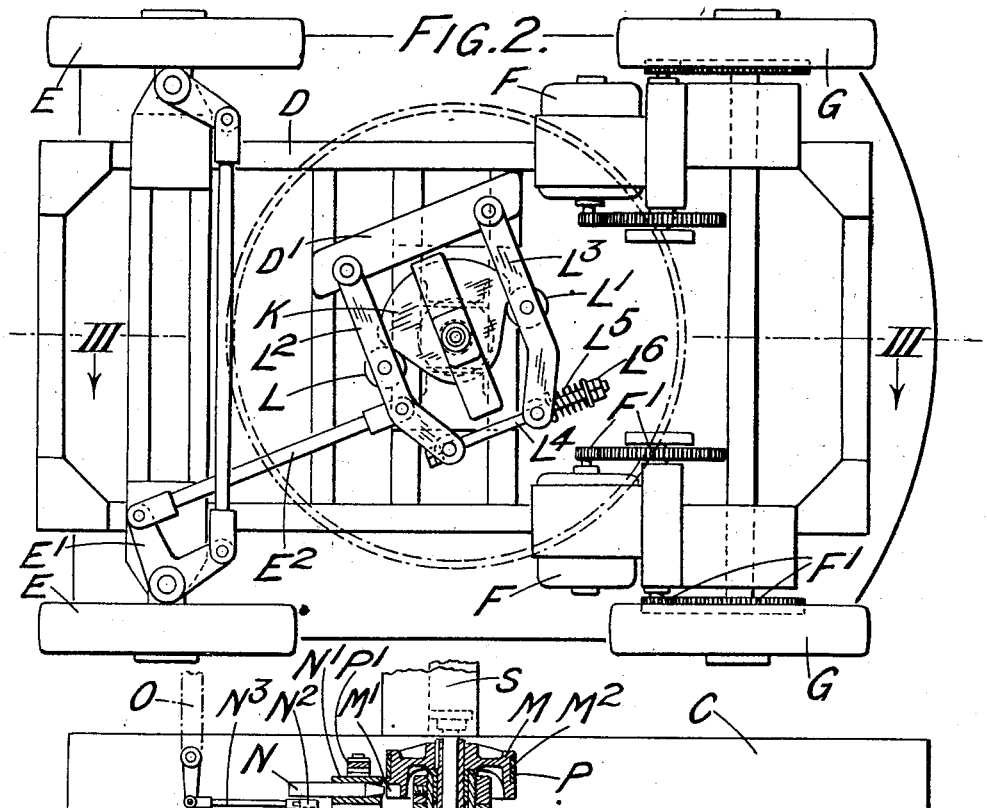
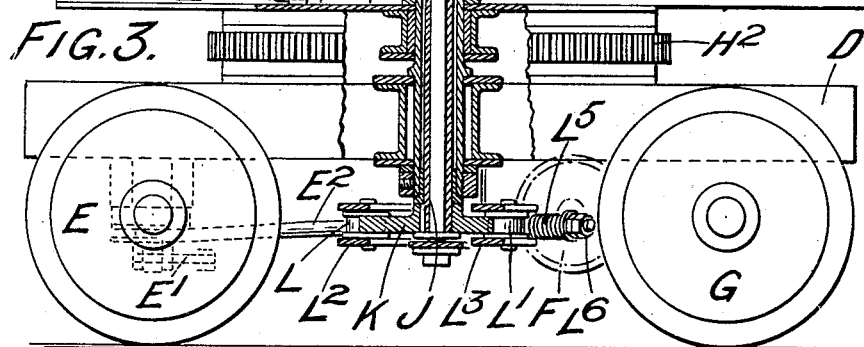
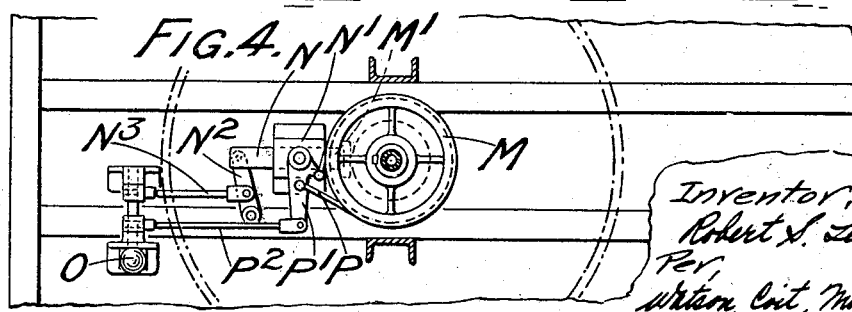

Patented Feb. 16, 1932

1,845,161

UNITED STATES PATENT OFFICE

ROBERT STANLEY LEWIS, OF IPSWICH, ENGLAND, ASSIGNOR TO RANSOMES & RAPIER LIMITED, OF IPSWICH, ENGLAND, A COMPANY OF GREAT BRITAIN

CRANE

Application filed February 25, 1929, Serial No. 342,561, and in Great Britain February 29, 1928.

This invention relates to self-propelled cranes of the railless type and has for its object to provide such a crane which can be manœuvred in a more restricted space and with greater facility than those now in use.

As a rule cranes of the railless self-propelled type are not furnished with a turntable, as the crane jib is slewed by manœuvring the whole vehicle. This either prevents the crane being slewed where space is very limited—as for example in relatively narrow gangways—or entails a complicated arrangement of steering wheels which prevents easy transition from slewing to travelling and vice versa.

According to this invention a platform or the like carrying the crane jib is mounted to turn upon a frame or chassis supported upon road wheels and an operative connection is furnished between one or more of these road wheels and the platform whereby the turning movements of the latter (preferably between certain limits only) can be imparted to the road wheels when it is desired to steer the chassis. The connection between the platform or its turning mechanism and the steering wheel or wheels of the vehicle is thus such that it can be uncoupled or engaged at will, so that the crane can be slewed while the truck or chassis is at rest. With such an arrangement, slewing of the jib and steering of the vehicle can be carried out simultaneously or as continuously consecutive operations, and since the operator's seat is preferably arranged upon the platform facing the point of the jib, the load can always be readily observed and accurate steering is facilitated.

The particular form of connection between the steering wheel or wheels of the chassis and the rotatable platform or its driving gear will naturally vary in accordance with the number of wheels which the chassis possesses and the type of steering gear employed, but in a simple case where the chassis has four wheels, two of which constitute steering wheels provided with the usual Ackerman steering gear, suitable link mechanism may be furnished between this gear and a cam or its equivalent, capable of being so connected to the rotatable platform or its driving mechanism that the movements of the platform are imparted to the steering wheels only between certain limits. Preferably the arrangement is such that when the platform is coupled to the steering mechanism, the steering wheels are automatically moved when the jib is slewed between certain predetermined limits, whether the head of the jib is pointing towards the front or the rear of the vehicle. Thus slewing of the jib over a range of, say, 20° on either side of the longitudinal centre line of the chassis, automatically actuates the steering wheels (assuming the steering gear is connected to the platform) whether the jib is pointing in the normal forward direction or is slewed so as to be pointing to the rear.

Any form of propelling mechanism may be provided for the truck, but where, as is preferred, one or more electric motors are used for this purpose, an automatic changeover switch may be provided so as to reverse the direction in which the chassis will move whenever the jib is turned beyond a line at right angles to the length of the chassis, thus facilitating steering or manœuvring of the vehicle.

In cranes of the runabout type it is desirable, if possible, to furnish the road wheels with power driven steering and it will be seen that according to this invention the desired result is obtained, since as power is normally used to rotate the platform and the latter or its driving gear is or can be positively connected to the steering gear, the steering movements are imparted to the road wheels by power and not merely by hand. The weight of the vehicle as a whole and the friction between the superstructure and the chassis further prevent any tendency for the steering wheels of the chassis to move when the vehicle is stationary.

Any suitable means may be used to lock or couple the platform to the steering gear, but in a preferred arrangement positive means such as a jaw clutch or the like are used for definite positions of the jib, e. g. to lock the platform to the steering gear when the jib is in direct alignment with the longitudinal centre line of the chassis, whilst, in addition, one or more friction clutches are furnished enabling the parts to be coupled at intermediate points.

One construction of crane in accordance with this invention is illustrated by way of example in the accompanying drawings, in which Figure 1 is a side elevation of the crane,
Figure 2 is an inverted plan,
Figure 3 is an elevation of the chassis and rotatable platform, partly in section on the line III—III of Figure 2.
Figure 4 is a partial plan, with the rotatable platform not shown, and
Figures 5-8 are diagrams on a reduced scale showing the limits of the automatic movement of the steering wheels with the jib when the locking means are engaged.

As shown in Figure 1, the crane proper comprises a jib A of the cantilever type mounted upon a rotatable platform C. The hoisting and derricking mechanism enclosed in a casing B is also carried on the platform behind the operator's seat $C^1$ which is below the jib and facing the jib head. Any suitable means may be used to rotate the hoisting and derricking barrels, but preferably these are driven by electric motors supplied with current from a generator driven by an internal combustion engine mounted on the platform. Such an arrangement is enclosed in the casing B but is not illustrated as per se, it forms no part of the present invention. Alternatively, current may be supplied by a trailing cable or from storage batteries, or some other form of prime mover may be employed.

The platform C is mounted to turn upon a truck or chassis D having four road wheels, one pair E of which are furnished with the usual Ackerman steering mechanism $E^1$ (Figure 2). Mounted on the chassis are two electric motors F connected by gearing $F^1$ to the driving wheels G by means of which the crane is propelled. Preferably these motors are supplied with current from the same source as the crane motors.

In addition to the motors above described, a further motor H is mounted vertically on the platform C and drives a pinion $H^1$ which engages a toothed wheel $H^2$ fixed to the chassis D so as to rotate the platform C together with the jib and its actuating mechanism relatively to the chassis.

In order to furnish an operative connection between the steering gear $E^1$ and some part of the platform by means of which, when a clutch or its equivalent is employed, the movements of the platform are imparted to the steering wheels, a vertical post J (Figure 3) is rotatably mounted on the chassis, the upper end of this post extending through the centre of the platform while its lower end carries a horizontal cam K. The cam K (Figure 2) is engaged on each side by rollers L and $L^1$ carried by links $L^2$ and $L^3$ respectively which are pivoted at one end to a cross-piece $D^1$ fixed to the chassis and are connected together at the other end by a rod $L^4$. A spring $L^5$ between a stop $L^6$ at the end of the rod $L^4$ and the link $L^3$ ensures that the ends of the links are pressed towards one another and that the rollers L and $L^1$ are maintained in contact with the cam K. A link $E^2$ connects the steering mechanism $E^1$ to the link $L^2$ so that movement of the links $L^2$ and $L^3$ due to rotation of the cam causes a corresponding movement of the steering mechanism $E^1$.

To the upper end of the post J which extends through the centre of the platform is keyed a flanged disc M provided with a recess $M^1$ so as to form a jaw clutch when the recess cooperates with a jaw N slidably mounted in a supporting post $N^1$ on the platform. The post J can then be positively locked to the rotatable platform C and, when so locked, actuates the steering wheels through the cam K.

The jaw N is connected by a link $N^2$ and a rod $N^3$ to a pivoted hand lever O arranged near the driver's seat so that when the jaw is opposite the recess $M^1$, movement of the lever O from its normal vertical position, in an anti-clockwise direction effects the above described locking of the post to the platform. The recess $M^1$ on the disc M is so disposed with respect to the cam K, and the jaw N on the platform with respect to the jib A, that the jaw is opposite the recess when the steering wheels are set for straightforward movement of the crane and the jib is pointing in the same direction.

Figures 5, 6, 7, 8:
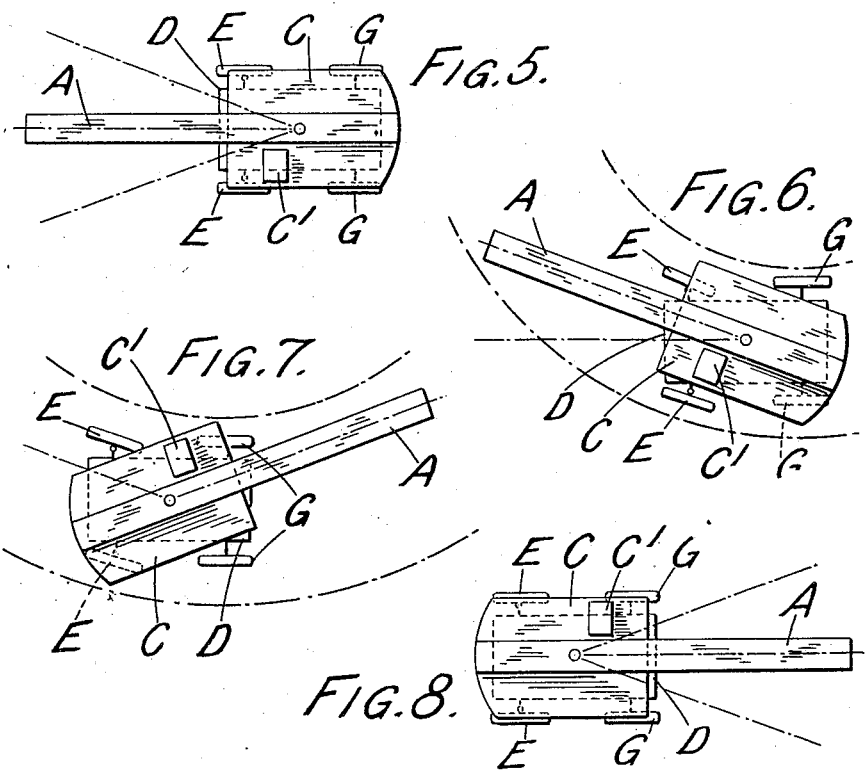

The profile of the cam K is so designed that when the clutch is engaged the steering mechanism is only actuated by movement of the platform between desired limits on each side of the central fore and aft positions of the jib. The limits may depend upon the ordinary mechanical conditions which govern the "steering lock" in vehicles, and conveniently are of the order of 20° each side of such central positions as indicated in chain lines in Figures 5 and 8. In Figure 6 the position of the steering wheels and jib are indicated in one of the fore limiting positions, further rotation of the platform and cam having no effect upon the steering wheels until the platform reaches the position shown in Figure 7. Rotation of the platform between the limits shown in Figure 8 then actuates the steering wheels although the jib is pointed aft.

When the jaw N is disengaged the platform will turn freely about the post J thus permitting the crane to be slewed, while the chassis is stationary, with moving the steering wheels. As, however, it may be desirable to control the steering wheels when the jib is slewed beyond the limiting positions in either direction, the disc M is provided with a friction surface M² which cooperates with a friction band P connected to the lever O by a link P¹ and a rod P² so that when the lever is moved from its normal vertical position in a clockwise direction the band is tightened and the platform and post J locked together. By this means the post J can be locked to the platform whatever the angular position of the platform with respect to the chassis and steering can be effected by movement of the platform and thus the post J, the cam K acting to limit the movement of the steering truck wheels in the manner previously described.

A controller Q is provided with the motor H and has an operating handle R in the form of a steering wheel or lever so that although in fact the operator is controlling the motor H which rotates the platform, in effect he makes use of this controller as a steering wheel, and an indicator or dial to show the position of the steering wheels is not necessary although such an indicator may be provided if desired.

The post J may conveniently be made hollow to contain the necessary cables for conveying electrical energy from the rotatable platform to the driving motors F on the chassis, a slip ring device enclosed in a suitable casing, indicated at S, (Figure 3) providing the necessary flexible connection between the platform and the chassis.

Conveniently, the motors F may be provided with a reversing switch (not shown) which is automatically operated if the jib A is turned so as to make more than a right angle with the length of the chassis. Thus when the jib is turned from the position shown in Figure 5 through more than 90°, the propelling motors are reversed so that the crane will travel in the reverse direction, i. e. in the same direction as that to which the jib is pointed.

It will be appreciated that the above description is by way of example only and that many modifications may be made in the design and construction of the crane including the turntable mechanism, the steering gear and the means for connecting the steering gear to the platform, without departing from the invention. For example, if desired four-wheel steering may be adopted or the chassis may be provided with a single steering wheel of the caster type although, of course, a four-wheel base gives improved stability over those supported upon three wheels. Further, the means employed to effect the derricking and hoisting operations or to rotate the platform upon the chassis may be very considerably modified and although separate electric motors have been described, such means may be varied within wide limits without departing from this invention.

In the following claims the expression "crane unit" includes the jib or its equivalent and the hoisting and/or derricking mechanism associated therewith. Further the reference to "steering truck wheels" is to be taken as covering a steering caster.

What I claim as my invention and desire to secure by Letters Patent is:—

1. In a railless crane having a crane unit mounted on a platform, the combination of a chassis having the platform rotatably mounted thereon, truck wheels for the chassis, steering mechanism associated with steering truck wheels, a positive clutch for connecting said mechanism and the platform when the crane unit and steering wheels are pointing in the same direction, and a friction clutch for connecting said mechanism and the platform whatever the relative positions of the crane unit and the steering wheels.

2. In a railless crane having a crane unit mounted on a platform, the combination of a chassis having the platform rotatably mounted thereon, truck wheels for the chassis, steering mechanism associated with steering truck wheels, and means operable at will from the platform for connecting said mechanism and the platform, the steering mechanism comprising a link device and a cam having such profile that only movements of the platform within predetermined limits are imparted to the steering wheels.

3. In a railless crane having a crane unit mounted on a platform, the combination of a chassis having the platform rotatably mounted thereon, truck wheels for the chassis, steering mechanism associated with steering truck wheels, a positive clutch for connecting said mechanism and the platform when the crane unit and the steering wheels are pointing in the same direction, and a friction clutch for connecting said mechanism and the platform whatever the relative positions of the crane unit and the steering wheels, the steering mechanism comprising a link device and a cam having such profile that only movements of the platform within predetermined limits are imparted to the steering wheels.

4. In a railless crane having a crane unit mounted on a platform, the combination of a chassis having the platform rotatably mounted thereon, truck wheels for the chassis, power-driven means for rotating the platform, steering mechanism associated with steering truck wheels, a positive clutch for connecting said mechanism and the platform when the crane unit and steering wheels are pointing in the same direction, and a friction clutch for connecting the mechanism and the platform whatever the relative positions of the crane unit and the steering wheels.

5. In a railless crane having a crane unit mounted on a platform, the combination of a chassis having the platform rotatably mounted thereon, truck wheels for the chassis, power-driven means for rotating the platform, steering mechanism associated with steering truck wheels, a positive clutch for connecting said mechanism and the platform when the crane unit and steering wheels are pointing in the same direction, and a friction clutch for connecting the mechanism and the platform whatever the relative positions of the crane unit and the steering wheels, the steering mechanism comprising a link device and a cam having such profile that only movements of the platform within predetermined limits are imparted to the steering wheels.

In testimony whereof I have signed my name to this specification.

ROBERT STANLEY LEWIS.